United States Patent [19]
Regehr

[11] 3,887,664
[45] June 3, 1975

[54] CONTACT BODY FOR THE TRANSFER OF HEAT AND/OR SUBSTANCES

[76] Inventor: Ulrich Regehr, Susterfeld 65, D-51 Aachen, Germany

[22] Filed: Apr. 18, 1973

[21] Appl. No.: 352,467

[52] U.S. Cl. ............................. 261/112; 165/166
[51] Int. Cl. ........................................ F28c 1/00
[58] Field of Search ....... 261/112, 99, 104; 165/166

[56] References Cited
UNITED STATES PATENTS
| | | | |
|---|---|---|---|
| 2,940,736 | 6/1960 | Odman | 165/166 |
| 3,151,675 | 10/1964 | Lysholm | 261/112 UX |
| 3,738,626 | 6/1973 | Norback | 261/112 |

FOREIGN PATENTS OR APPLICATIONS
| | | | |
|---|---|---|---|
| 1,201,151 | 8/1970 | United Kingdom | 165/166 |
| 1,197,933 | 7/1970 | United Kingdom | 165/166 |

*Primary Examiner*—Frank W. Lutter
*Assistant Examiner*—William Cuchlinski, Jr.
*Attorney, Agent, or Firm*—Otto John Munz

[57] ABSTRACT

A contact body for the direct transfer of heat and/or substances between a liquid medium and a gaseous medium composed of adjoining cross-wise oriented, undulated flow panels, shaped into parallel equidistantly spaced troughs with undulation bottoms and undulation ridges truncated at two levels at regular intervals to reduce the number of contact points between adjoining flow panels, thereby reducing the pressure drop in the transverse flow of the gaseous medium.

8 Claims, 5 Drawing Figures

PATENTED JUN 3 1975　　　　　　　　　　　3,887,664

SHEET　　3

CONTACT BODY FOR THE TRANSFER OF HEAT AND/OR SUBSTANCES

BACKGROUND OF THE INVENTION

1. Field of the Invention

The invention relates to contact bodies for the direct transfer of heat and/or substances between a liquid medium and a gaseous medium, and in particular to contact bodies composed of cross-wise oriented, undulated flow panels which admit a liquid flow from top to bottom and a gas flow transverse to the liquid flow.

2. Description of the Prior Art

Contact bodies for scrubbers, featuring cross-wise oriented, undulated flow panels are known from the prior art. One such structure is disclosed in the German Auslegeschrift (Opposition Publication) No. 1,299,655. Such devices have a high efficiency of heat and/or substance transfer, especially in the case where the flow panels are of the liquid-absorbent type. It was found, however, that this type of contact body structure has the shortcoming of creating a considerable pressure drop on the transversely flowing gas, a pressure drop which is not instrumental in the heat or substance transfer. This condition was found to be particularly prevalent with flow panels whose undulations had a wavelength between 4 to 6 cm and a wave amplitude, or height between 1 and 3 cm. Considerable pressure drop may also occur with other undulations, however.

SUMMARY OF THE INVENTION

It is a primary objective of the present invention to overcome the aforementioned shortcoming by providing a contact body of the type mentioned above, in which the pressure drop in the gas flow is reduced without diminishing the effectiveness of the heat and/or substance transfer.

The invention proposes to attain the above objective by suggesting a novel contact body for the transfer of heat and/or substances between a liquid medium and a gaseous medium which includes several identical flow panels with adjoiningly cross-wise arranged undulations, shaped as troughs connected together at their contiguous undulations bottoms and ondulations ridges, the general orientation of the ondulations ridges being offset from the vertical axis by less than ninety degrees. In the novel contact body of the invention the undulation ridges and ondulation bottoms of the flow panels are provided with regularly spaced first truncations in the undulation on a first level below the ridges and bottoms with second truncations on a second level, further removed from the ridges and bottoms, the second truncations interposed in the spaces between the first truncations and merging with them by third inclined truncation connecting the edges of the respective first and second adjacent truncations. Thereby the number of contact points between intersecting undulation ridges and ondulation bottoms of adjoining flow panels is reduced. A considerable reduction of the pressure drop in the gas flow can be obtained by merely providing such truncations which are longer than one undulation wavelength, but less than two such wavelengths. These truncations are preferably so aligned that they form matching horizontal pattern rows in each flow panel.

The invention is based on the discovery that the abovementioned undesirable pressure drop, which is of little or no benefit to the heat or substance transfer, is primarily due to the flow resistance around the numerous contact points between the intersecting ridges and bottoms of adjoining flow panels. It was also found that the number of these contact points can be considerably reduced from a mechanical and design standpoint, without impairing the stability and mechanical resistance of the contact body. Thus, the truncations suggested by the invention eliminate a portion of the contact points, thereby improving the flow of the gaseous medium in a simple and very effective way. The flow of the liquid medium is likewise affected by these truncations, and it may in this case be advisable to provide additional structural elements for this purpose. These additional elements to be provided in combination with the truncations may be in the form of feed grooves for the liquid medium which are arranged obliquely to the truncations, at an obtuse angle to the vertical axis, and of a length no less than one-half of a wavelength. Of course, it is also possible to provide such feed grooves of a length which is equal to, or even a multiple of a full wave length. In general, it is preferable to arrange a number of these feed grooves in a row pattern. In order to further improve the distribution of the liquid medium below the feed grooves, the invention further suggests to provide additional turbulence grooves arranged separately or in a row pattern underneath the feed grooves, the turbulence grooves being likewise inclined relative to the truncations and relative to the vertical axis, but at a smaller obtuse angle to the latter than the feed grooves. Both the feed grooves and the turbulence grooves may be convex or concave in profile, when looking at a single flow panel from one side; or they may be alternatingly convex and concave.

The major advantage of this novel contact body structure is, as mentioned, a reduction of the pressure drop in the gas flow, especially of that portion of the pressure drop which is not directly attributable to the heat and/or substance transfer itself. One result of this pressure drop reduction is an improved operational efficiency. A further advantage is available in the possibility of constructing the contact body of the invention as an entirely novel element for scrubbing or transfer devices, by providing on the entire surface of the flow panels — including that of the truncations — a fiber pile which acts as a carrier for storing the liquid medium. In this case the contact body becomes a liquid-absorbing storage element, and the supply of liquid medium need no longer be on a continuous basis.

It should be understood that wherever reference is made in this disclosure to undulations, the geometric form of the latter is not intended to be limited to the sine-wave or any other particular wave form, but may also include regular folds, such as triangular folds, for example. It is generally even advantageous to use such fold profiles for the undulations of the flow panels. Similarly, it should be understood that the term wavelength refers to the distance between successive undulations ridges, or between successive ondulations bottoms, respectively.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows.

DESCRIPTION OF THE PREFERRED EMBODIMENT

Figure 1:
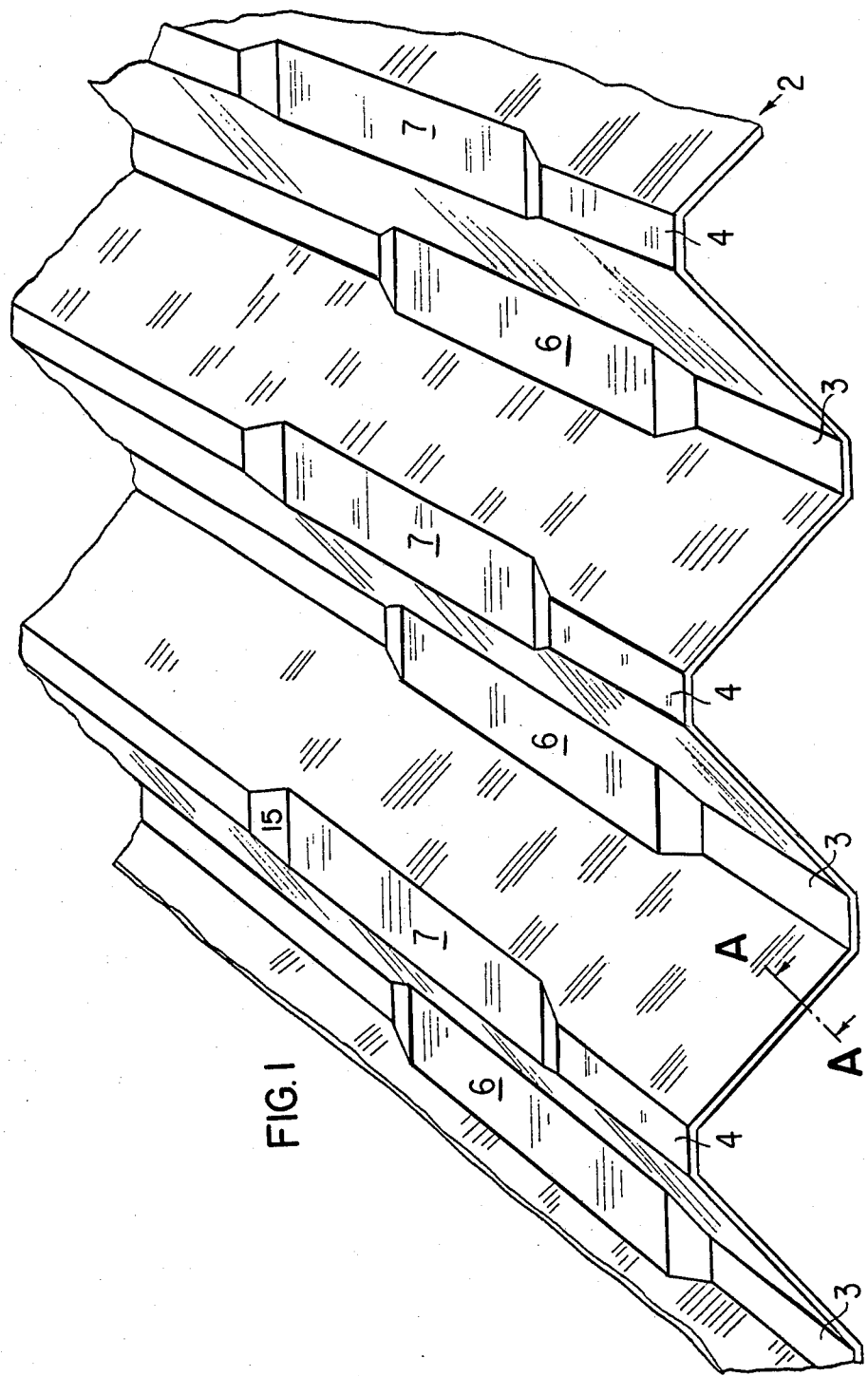
FIG. 1 shows in a perspective view a portion of a single flow panel, as suggested by the invention.
Figure 2:
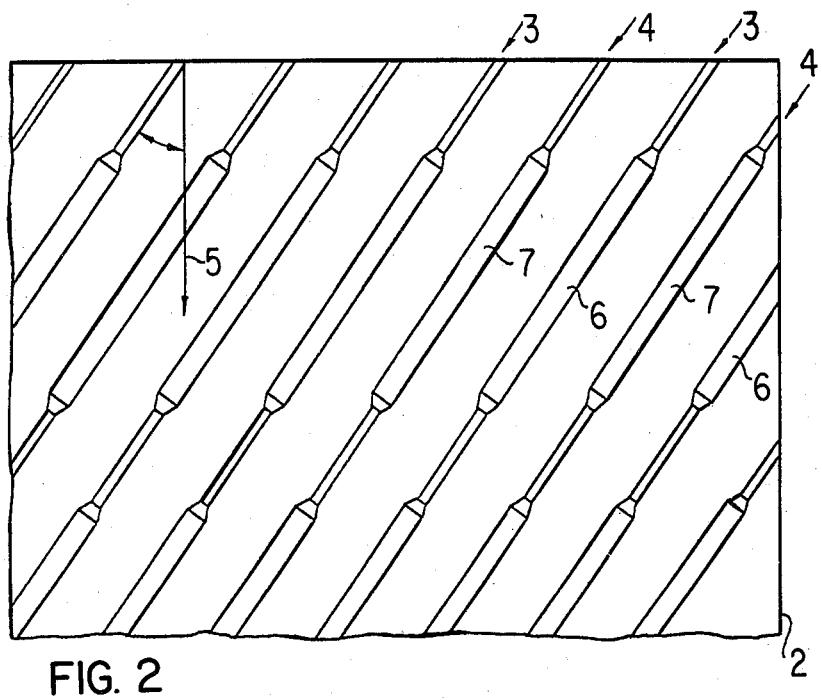
FIG. 2 shows in a plan view of smaller scale a portion of the flow panel of FIG. 1.
Figure 3:
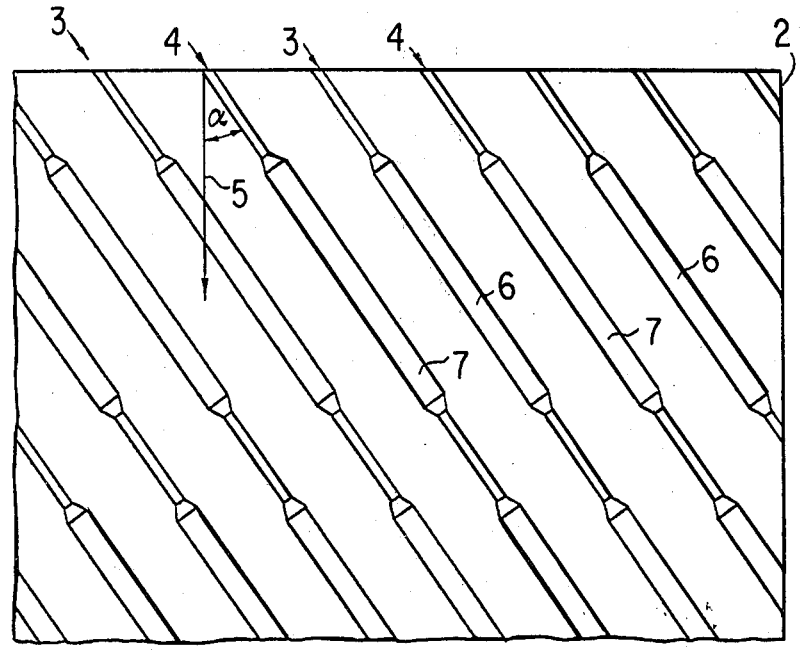
FIG. 3 shows in a similar plan view a portion of an identical flow panel in an orientation in which it would be adjoined to the top or bottom side of the panel of FIG. 2.
Figure 4:
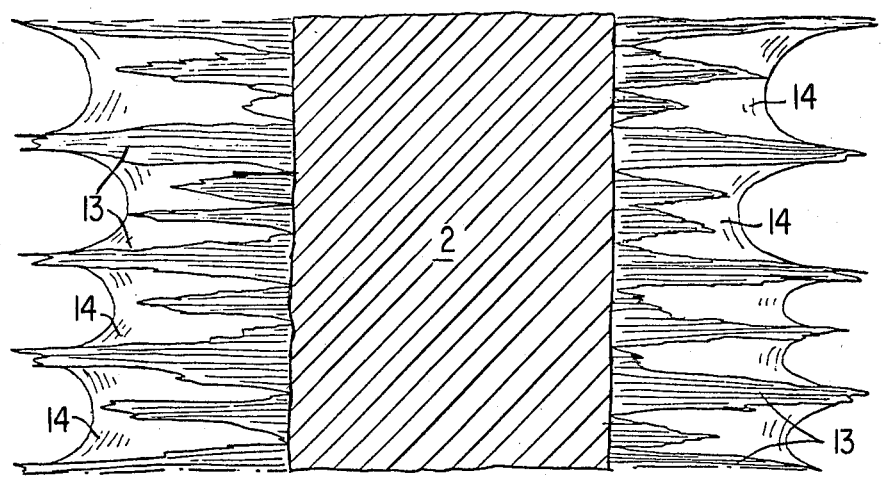
FIG. 4 shows the flow panels of FIGS. 2 and 3 in an assembly configuration, as part of a contact body embodying the invention.

The contact body 1, as illustrated somewhat schematically in FIG. 4 of the drawings, is designed for the direct transfer of heat and/or substances between fluid substances, usually a liquid medium and a gaseous medium. The contact body 1 is composed of several identical flow panels 2 in the form of sheets of undulated cross-section, as can be seen in FIGS. 1, 2 and 3. Each flow panel 2 has a succession of obliquely oriented undulations, forming troughs comprising bottoms 3, and ridges 4. The bottom of the trough on one side of the sheet panel represents the ridge of a trough on the opposing side thereof. A second panel with similar undulation bottoms 3 and ridges 4, but oriented at a different angle (FIG. 3), when placed contiguous with the first panel (FIG. 1), defines a number of contact points therewith at which the panels may be permanently attached to one another by bonding, welding, or any other convenient joining method. The general orientation of the bottoms 3 and ridges 4 is such that they form an angle and to the vertical axis, the latter being indicated by arrow 5 of FIGS. 2, 3 and 4. This angle is smaller than 90°.

As can best be seen in FIG. 1, the bottoms 3 and the ridges 4 of each flow panel 2 are truncated at the tips of the troughs or bottoms respectively at a first level adjacent the tips. These first level truncations are spaced from each other regular distances. Further away from the tips are second level truncations which are interposed in the spaces between the first level truncations truncations 6 and 7. These truncations are of limited length and are repeated at regular intervals along the bottoms 3 and ridges 4. The truncations of adjacent ondulations form a regular horizontal row pattern, as shown in FIGS. 2 and 3. The first and second level truncations are connected by and merge with a third inclined truncation 16, which is shown in FIG. 1 as a quadrangle. Matching rows of bottom truncations 6 and ridge truncations 7 on adjoining flow panels 2 thus eliminate a portion of the contact points 8 between intersecting ridges 4 of the lower panel and bottoms 3 of the upper panel, for example, (FIG. 4). In a preferred embodiment of the invention the length of the truncations 6 and 7 is in excess of one wavelength, but less than two wave-lengths of the ondulation profile. The longitudinal spacing between successive truncations 6 and ridge truncations 7 along a particular bottom 3 or ridge 4 is preferably approximately equal to one-half of the length of the truncations 6 and 7.

In the assembled contact body of FIG. 4, the flow panel 2 of FIG. 2 is shown on top, and the flow panel 2 of FIG. 3 is shown underneath. The ridges 4 of the upper panel are indicated by heavy full lines, the bottom 3 of this panel being indicated by light full lines. Similarly, the ridges 4 of the lower panel are shown in heavy broken lines and the bottom lines 3 are shown in light broken lines. Without truncations 6 and 7 all intersections between an bottom 3 of the upper panel and an ridge 4 of the lower panel, designated by numerals 8 in FIG. 4, would represent contact points between the two flow panels. The truncations, however, eliminate every second horizontal row of contact points 8, if arranged in a pattern as shown in FIG. 4.

The preferred embodiment shown in FIG. 4 further shows the possibility of adding to the truncations 6 and 7 a set of feed grooves 9 which are arranged on the entry side of the liquid medium and which run at an angle to the truncations. As seen when viewing FIG. 3, these feed grooves 9 may be either concave or convex in shape, or they may be alternatingly concave and convex. They are oriented at an obtuse angle 10 relative to the vertical axis, and their purpose is to distribute the entering liquid medium over the full width of the flow panels 2. The length of the feed grooves 9 is preferably no less than one-half of a wave-length; the embodiment of FIG. 4 shows grooves 9 of a length approximately equal to a full wave-length. It is of course also possible to use still longer feed grooves 9.

Underneath the feed grooves 9 the preferred embodiment of the invention further includes a series of turbulence grooves 11 whose orientation to the vertical axis likewise includes an obtuse angle 12, but the latter is of smaller size than angle 10 of the feed grooves 9. These turbulence grooves 11 have a turbulence-creating effect on both the liquid medium and the gaseous medium.

Figure 5:
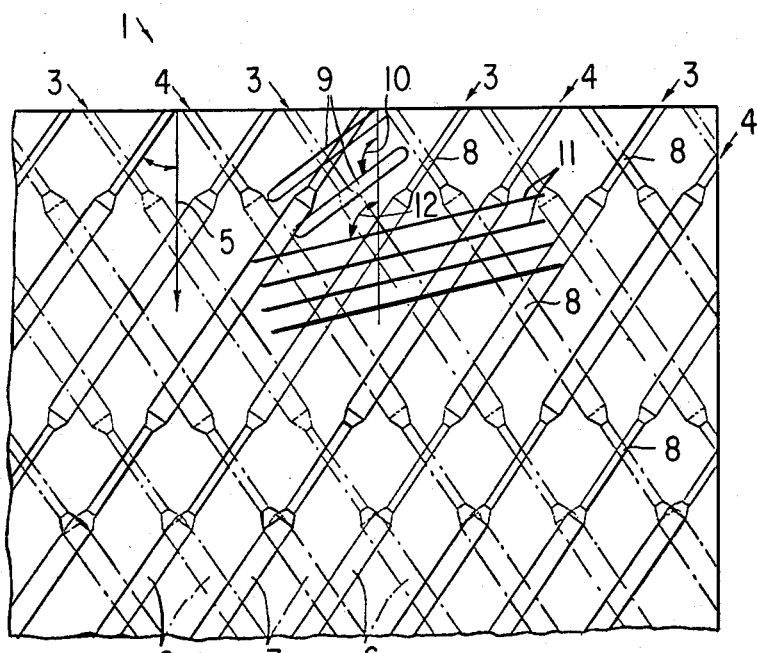
FIG. 5 shows a greatly enlarged cross-sectional detail of the flow panel of FIG. 1 when cut along the section line A—A in FIG. 1, for example.

In FIG. 5 is illustrated a particularly advantageous feature of the invention, the surfaces of the flow panel 2 being provided with a fiber pile 13 which acts as a storage agent by retaining some of the liquid medium. This fiber pile may also cover the truncations 6 and 7 of the bottoms 3 and ondulations ridges 4. The greatly enlarged illustration of FIG. 5 shows liquid medium 14 being retained between fibers 13 of the pile. When flow panels of this kind are used in a contact body 1 as suggested by the invention, the previously continuous supply of liquid medium may be replaced by an intermittent supply of liquid, although a continuous supply may still be desirable.

It should be understood, of course, that the foregoing disclosure describes only a preferred embodiment of the invention and that it is intended to cover all changes and modifications of this example of the invention which fall within the scope of the appended claims.

I claim:

1. A contact body for the direct transfer of heat and/or substances between a liquid medium and a gaseous medium comprising in combination:

at least one first vertical flow sheet-panel having a plurality of equidistantly spaced regular undulations in its profile, defining parallel troughs with the undulations inclined to the vertical axis at an angle of less than ninety degrees;

at least one second vertical flow panel with similar undulations in its sheet profile, its undulations being oppositely inclined to the vertical axis at an angle likewise less than ninety degrees;

the first and second flow panels being contiguously joined together at the prominent areas of their undulations, each said trough comprising: a plurality of first truncations at a first level adjacent to the imaginary tips of the said trough equidistantly spaced from each other;

said first level truncations defining ridges and bottoms;

a plurality of second truncations at a second level spaced from the said first level at a second level and equidistantly spaced from each other in the spaces between the said first truncations;

the latter being a series of contact areas where the bottoms of one flow panel meet the ridges of the adjoining flow panel;

the truncations of the first and second flow panels being of limited length in the undulation and being so arranged that a portion of the contact points between adjoining flow panels is eliminated;

the adjoining flow panels thus being arranged for a top-to-bottom flow of a liquid medium and a transverse flow of a gaseous medium, the latter flow being facilitated by the elimination of some of the contact points.

2. A contact body as defined in claim 1, wherein:

the undulations in the sheet profile of the flow panels are essentially of the folded, triangular type, the crosssectional profile across the bottom truncations and ridge truncations being substantially trapezoidal.

3. A contact body as claimed in claim 2, said trough further comprising:

a plurality of third truncations inclined toward connecting and merging with the edges of said first and second truncations, said third truncations being quadrangular.

4. A contact body as defined in claim 1, wherein:

the truncations are regularly spaced along the bottoms and ridges, respectively and are aligned in a pattern of substantially horizontal truncation rows, adjoining flow panels having their truncation rows facing one another in approximate vertical alignment.

5. A contact body as defined in claim 4, wherein:

the length of the bottom truncations and ridge truncations is such that the truncations reach over at least one ondulation wavelength of the adjoining flow panel, but not over two such wavelengths, so that one-half of the contact points between adjoining flow panels are eliminated.

6. A contact body as defined in claim 1, wherein:

the flow panels include on their surfaces a fiber pile for the retention and storage of liquid medium, the truncations being likewise covered by such fiber pile.

7. A contact body for the direct transfer of heat and/or substances between a liquid medium and a gaseous medium comprising in combination:

at least one first vertical flow panel with regular undulations in its sheet profile defining undulation bottoms and undulations ridges, the undulations being inclined to the vertical axis at an angle of less than 90°;

at least one second vertical flow panel with similar undulations in its sheet profile, its undulations being oppositely inclined to the vertical axis at an angle likewise less than ninety degrees;

the first and second flow panels being contiguously joined together at the prominent points of their undulations, the latter being a series of contact points where the undulation bottoms of one flow panel meet the undulations ridges of the adjoining flow panel;

the undulations of the first and second flow panels further including truncations of limited length in the undulation bottoms and undulation ridges, the truncations being so arranged that a portion of the contact points between adjoining flow panels is eliminated;

the adjoining flow panels thus being arranged for a top-to-bottom flow of a liquid medium and a transverse flow of a gaseous medium, the latter flow being facilitated by the elimination of some of the contact points;

the undulations in the sheet profile of the flow panels are essentially of the folded, triangular type, the cross-sectional profile across the bottom truncations and ridge truncations being substantially trapezoidal;

the truncations of the undulations bottoms and undulation ridges are regularly spaced along the bottoms and ridges, respectively and are aligned in a pattern of substantially horizontal truncation rows, adjoining flow panels having their truncation rows facing one another in approximate vertical alignment;

the length of the bottom truncations and ridge truncations in the undulations is such that the truncations reach over at least one undulation wavelength of the adjoining flow panel, but not over two such wavelengths, so that one-half of the contact points between adjoining flow panels are eliminated;

a plurality of feed grooves arranged at the liquid intake side of the adjoining flow panels in transverse orientation to the truncations and at an obtuse angle to the vertical axis; the length of these feed grooves being no less than one-half of the wavelength of the undulations.

8. A contact body for the direct transfer of heat and/or substances between a liquid medium and a gaseous medium comprising in combination:

at least one first vertical flow panel with regular undulations in its sheet profile defining undulation bottoms and undulations ridges, the undulations being inclined to the vertical axis at an angle of less than ninety degrees;

at least one second vertical flow panel with similar undulations in its sheet profile, its undulations being oppositely inclined to the vertical axis at an angle likewise less than 90°;

the first and second flow panels being contiguously joined together at the prominent points of their undulations, the latter being a series of contact points where the undulation bottoms of one flow panel meet the undulations ridges of the adjoining flow panel;

the undulations of the first and second flow panels further including truncations of limited length in the undulation bottoms and undulation ridges, the truncations being so arranged that a portion of the contact points between adjoining flow panels is eliminated;

the adjoining flow panels thus being arranged for a top-to-bottom flow of a liquid medium and a transverse flow of a gaseous medium, the latter flow being facilitated by the elimination of some of the contact points;

the undulations in the sheet profile of the flow panels are essentially of the folded, triangular type, the cross-sectional profile across the bottom truncations and ridge truncations being substantially trapezoidal;

the truncations of the undulations bottoms and undulation ridges are regularly spaced along the bottoms and ridges, respectively and are aligned in a pattern of substantially horizontal truncation rows, adjoining flow panels having their truncation rows facing one another in approximate vertical alignment;

the length of the bottom truncations and ridge truncations in the undulations is such that the truncations reach over at least one undulation wavelength of the adjoining flow panel, but not over two such wavelengths, so that one-half of the contact points between adjoining flow panels are eliminated;

a series of additional turbulence grooves arranged underneath the feed grooves of the flow panels at an obtuse angle to the vertical axis which is smaller than that of the feed grooves.

* * * * *

UNITED STATES PATENT OFFICE
CERTIFICATE OF CORRECTION

Patent No. 3,887,664      Dated June 3, 1975

Inventor(s) Ulrich Regehr

It is certified that error appears in the above-identified patent and that said Letters Patent are hereby corrected as shown below:

On the cover sheet insert:

-- [30]  Foreign Application Priority Data

Germany            22191302        April 19, 1972   --.

Signed and Sealed this twenty-third Day of September 1975

[SEAL]

Attest:

RUTH C. MASON
Attesting Officer

C. MARSHALL DANN
Commissioner of Patents and Trademarks